Figure 1:
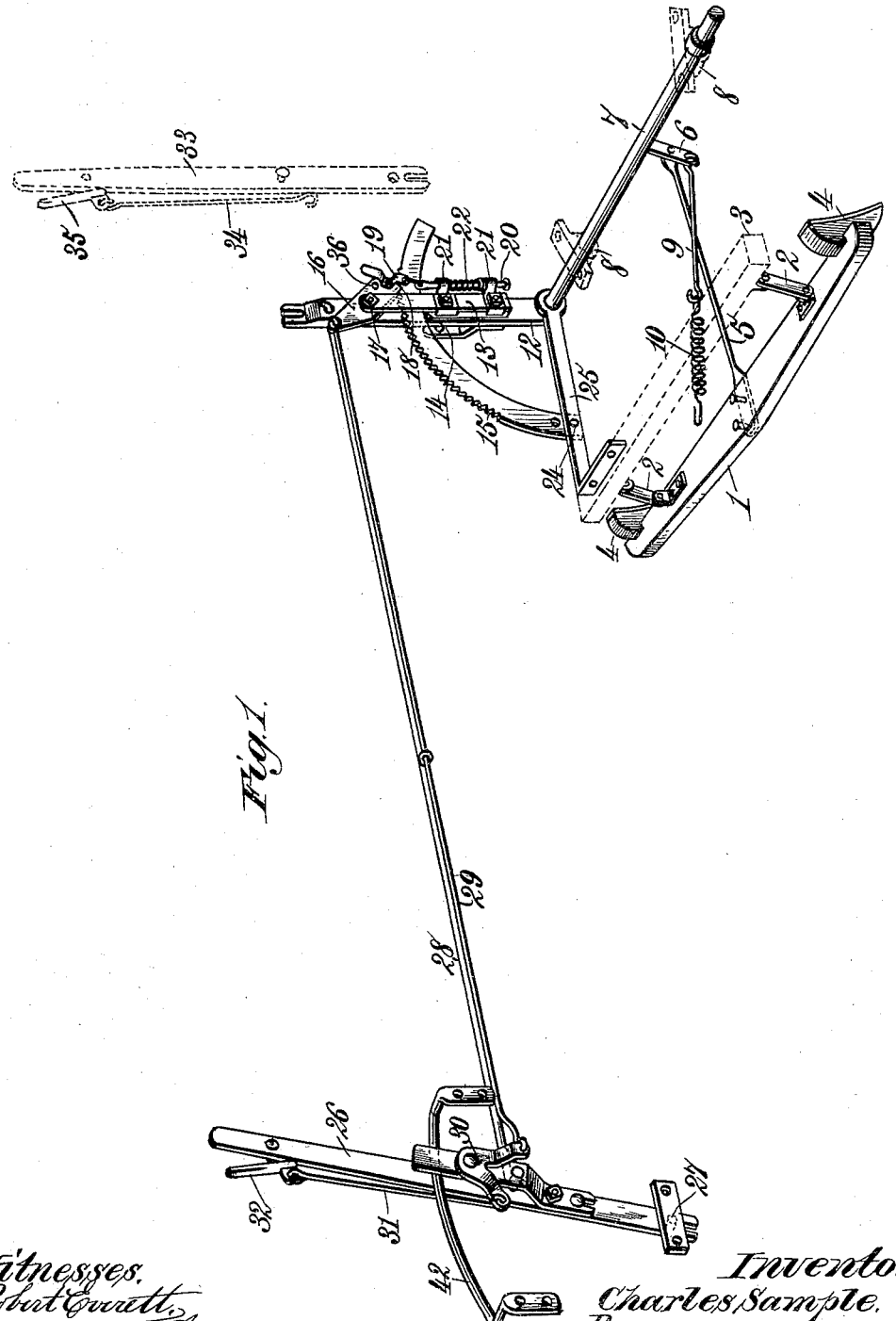

(No Model.) 2 Sheets—Sheet 1.

C. SAMPLE.
VEHICLE BRAKE.

No. 604,668. Patented May 24, 1898.

Witnesses.
Robert Everett
[signature]

Inventor.
Charles Sample.
By James L. Norris
Atty.

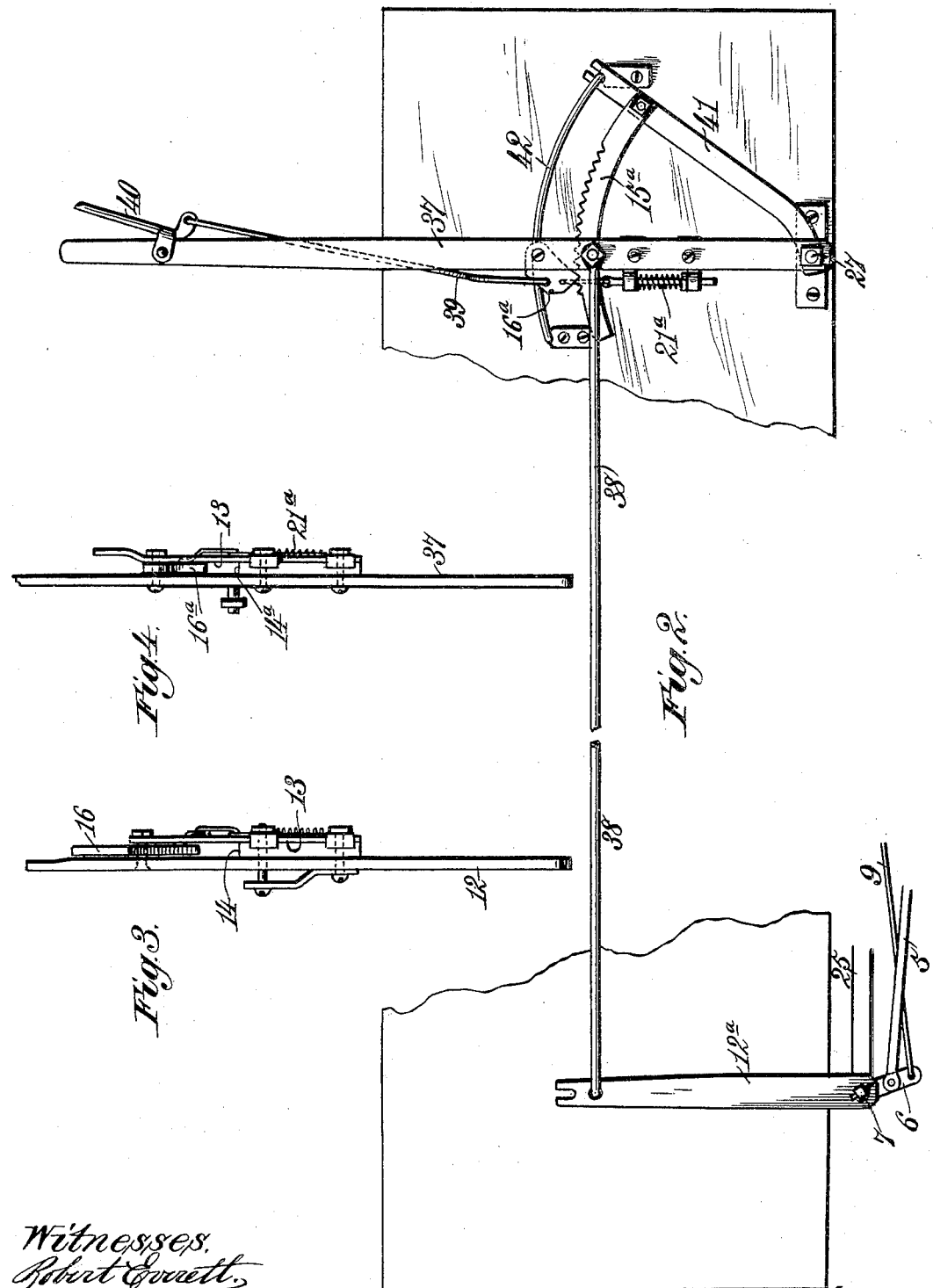

UNITED STATES PATENT OFFICE.

CHARLES SAMPLE, OF VALLEY GROVE, WEST VIRGINIA.

VEHICLE-BRAKE.

SPECIFICATION forming part of Letters Patent No. 604,668, dated May 24, 1898.

Application filed September 29, 1897. Serial No. 653,500. (No model.)

*To all whom it may concern:*

Be it known that I, CHARLES SAMPLE, a citizen of the United States, residing at Valley Grove, in the county of Ohio and State of West Virginia, have invented new and useful Improvements in Vehicle-Brakes, of which the following is a specification.

This invention relates to the brake mechanisms for wheeled vehicles described and claimed in Letters Patent Nos. 521,389 and 543,754, issued, respectively, to me June 12, 1894, and July 20, 1895. The brake mechanisms described in the patents referred to are susceptible of being controlled through the medium of a hand-lever either from a seat at the front end of a box-wagon or from the rear of a wagon or from the top of a load, and in each a rock-shaft connected with the brake-beam is actuated by a lever having a pivoted rectilinear ratchet-bar working through and engaging a fixed guide or slotted plate, a spring serving to hold the ratchet-bar in engagement with the guide or slotted plate to lock the brakes, suitable means being employed to swing the lever to turn the rock-shaft and disengage the ratchet-bar from the guide or slotted plate when the brakes are to be released.

The chief object of my present invention is to secure a more efficient, satisfactory, practicable, positive, and rigid locking of the brakes when set or applied to the vehicle-wheels.

The invention also has for its object to improve the brake-locking devices and provide a segmental ratchet-bar mounted upon a support and in operative connection with a guide having an abutment or shoulder, against which the smooth lower edge of the ratchet-bar is forced by the spring-actuated ratchet-dog when the brakes are set or applied, whereby the ratchet-bar is more securely held or locked, the action of the parts are improved, and the efficiency of the brake mechanism is promoted.

These objects are accomplished in the manner and by the means hereinafter described and claimed, reference being made to the accompanying drawings, in which—

Figure 1 is a perspective view of the improved brake mechanism when used as a box-wagon brake, sufficient parts of the vehicle being illustrated to show the application of the invention thereto. Fig. 2 is a side elevation showing the invention in connection with that type of brake where the segmental ratchet and the ratchet-dog are arranged in operative connection with a hand-lever designed to be located at the front end of the vehicle and to connect with the lever at the rear portion, which is mounted on the rock-shaft. Fig. 3 is a detail edge view of the lever which in Fig. 1 is attached to the rock-shaft, the segmental ratchet-bar being omitted. Fig. 4 is a similar view of a portion of the hand-lever shown in Fig. 2.

In order to enable those skilled in the art to make and use my invention, I will now describe the same in detail, referring to the drawings, wherein—

The numeral 1 indicates a brake-bar suspended by links 2 from or otherwise supported by a fixed cross-bar 3, forming a part of the running-gear. The ends of the brake-bar are provided with brake-shoes 4 of any construction suitable for the purpose in hand, and at its center the brake-bar is attached to the front end of a rod 5, having its rear end pivoted to a pendent arm 6, rigid on the central portion of a transverse rock-shaft 7, journaled in bearings 8, secured to suitable parts of the running-gear. The pendent arm 6 is practically a crank-arm and is connected at its lower end to one end of a link 9, which is acted on at its other end by a suitable spring 10, the tendency of which is to pull the pendent arm 6 forward or in a direction to release the brake-shoes from contact with the wheels of the vehicle. The rock-shaft 7 is provided at one end with a rigidly-attached upwardly-projecting lever 12, having at its inner side an attached plate 13, constructed with an abutment or shoulder 14, and so placed relatively to the lever as to constitute a guide through which a segmental ratchet-bar 15 passes. The beveled ratchet-teeth of the bar are formed in the upper or outer edge thereof and the lower or inner edge of the bar is smooth and rests and slides upon the abutment or shoulder 14. In the space between the upper end of the plate 13 and the lever 12 is arranged a ratchet-dog 16, mounted at or near its center on a pivot pin or bolt 17. The lower acting end of the dog is beveled in opposite directions to provide a pointed extremity 18 to engage between the beveled ratchet-teeth of the segmental ratchet-bar. The lower end portion of the dog is provided at its inner side with a lateral projection 19 in the form of a bracket or plate suitably secured in position and serving for the attachment of one end of a pin or rod 20, slidable in guide-eyes 21 on the plate 13 and acted upon by a spring 22 in such manner that the spring normally tends to press the pin or rod downward, thereby drawing the acting end of the dog 16 into engagement with the segmental ratchet-bar 15 and forcing the lower edge of the latter firmly against the abutment or shoulder 14. While I have described the dog 16 as connected with a spring-pressed pin or rod 20, it is obvious that the spring 22 may be made to otherwise act upon the dog to secure the same result.

The segmental ratchet-bar 15 is pivoted at its lower end, as at 24, to a support 25, which in Fig. 1 is composed of a brace plate or bar extending from the cross-bar 3 to the rock-shaft 7, the latter passing through an eye at the rear end of the rod and being firmly connected with the lower end of the lever 12, as before stated.

The pivoted end of the ratchet-bar is preferably provided with two or more holes, so that it can be pivoted in any one of the holes if adjustment of the ratchet-bar should be desired.

If a brake-operating hand-lever, as at 26, Fig. 1, is employed at the front end of the vehicle—as, for example, on a box-wagon—this lever is pivotally mounted at its lower end on a suitable support or stud 27, and is connected by a rigid rod 28 and a dog-tripping wire or rod 29 with the lever 12 and the upper end of the ratchet-dog 16, the rod 28 engaging the lever and the rod or wire 29 engaging the dog. The tripping wire or rod 29 is connected with one arm of a small bell-crank lever 30, pivoted to the hand-lever and having its other arm connected by a link 31 with a pivoted finger-piece 32 at the upper end of the hand-lever, all in such manner that when the latter is swung forward the lever 12 is drawn forward, the ratchet-dog 16 glides over the ratchet-teeth of the segmental ratchet-bar, but will engage the same to prevent back motion, and the rock-shaft 7 is turned in the direction required to set or apply the brakes to the vehicle-wheels. When it is desired to release the brakes, the finger-piece 32 is operated to move the tripping wire or rod 29 longitudinally for the purpose of disengaging the ratchet-dog 16 from the teeth of the segmental ratchet-bar, whereupon the brakes will be instantly released by the action of the spring 10, as will be obvious.

In the forward motion of the lever 12 the ratchet-dog 16 is pressed by the spring 22 more or less tightly down upon the toothed upper or outer edge of the ratchet-bar, and consequently the smooth lower or inner edge of this bar is firmly pressed against the abutment or shoulder 14 on the plate 13, whereby such a binding effect is produced that when the brakes are set or applied a more efficient, positive, and rigid locking of the same in their set position is obtained, in which respect the present improvements are advantageous over the ratchet mechanism illustrated in my former patents.

The lever 12 which carries the ratchet-dog, is constructed to receive a detachable lever-handle 33, (indicated by dotted lines,) which can be used for operating the brakes from the rear portion of the vehicle, as will be obvious. When the lever-handle 33 is employed, the link 34 of its finger-piece 35 should be connected with an eye or orifice 36 in the dog 16 for disengaging the latter from the ratchet-bar whenever the brakes are to be released.

The rigid rod 28 and the dog-tripping wire or rod 29 are constructed at their ends with hooks which can, respectively, be readily engaged with and disengaged from orifices in the lever 12, ratchet-dog 16, and levers 26 and 30, whereby the use of bolts for connecting these parts is dispensed with.

In Fig. 2 of the drawings the segmental ratchet-bar 15$^a$ and the spring-pressed ratchet-dog 16$^a$ are arranged in operative connection with a hand-lever 37, designed to be pivotally mounted on the stud or support 27 at the front end of the wagon-body. Where this arrangement of the ratchet bar and dog is employed, the hand-lever 37 is connected by a rod 38 directly with the lever 12$^a$ on the rock-shaft 7, which actuates the brake-bar, as hereinbefore stated with reference to Fig. 1. The operations of the segmental ratchet-bar and the spring-pressed ratchet-dog are the same as heretofore explained; but the dog is connected by a link 39 with a pivoted finger-piece 40 at the upper end of the lever-handle for disengaging the dog from the ratchet-bar when the brakes are to be released. The spring 21$^a$, which acts upon the dog 16$^a$, also serves to force the pivoted segmental ratchet-bar in a downward direction, whereby the lower smooth edge of the bar is made to bind against an abutment or shoulder 14$^a$, Fig. 4, as hereinbefore described, for the purpose of securing the more efficient, positive, and rigid locking of the brakes when they are set.

In Fig. 2 the segmental ratchet-bar 15$^a$ is pivotally mounted on a plate 41, rising from the stud 27 and slotted at its upper end to engage a portion of the guide-rail 42, which guides the hand-lever 37 in its to-and-fro motions. The guide-rail 42 also performs the same function for the lever 26, as shown in Fig. 1.

The lever 33 (indicated by dotted lines) is, in fact, the same lever as the lever 26, Fig. 1, constructed to be detachably connected with the lever 12 or to be applied at the front, as will be obvious.

Inasmuch as the essential features of my present invention reside in the combination, with suitable wheel-brakes, of a swinging lever, a segmental ratchet-bar pivoted at one end to a support, and a spring-pressed ratchet-dog engaging ratchet-teeth in the upper edge of the ratchet-bar and acted on by its spring to force the lower edge of the ratchet-bar firmly against an abutment or shoulder when the brakes are set, I do not wish to be understood as limiting myself to any particular location of these parts, as they may be arranged at the rear of the vehicle, as in Fig. 1, or at the front of the vehicle, as in Fig. 2, or be otherwise arranged for conjoint operation with the lever on the rock-shaft, by which the brake-bar is actuated.

The present invention provides novel, simple, efficient, and economical means for securing a positive locking of the brakes when set and is a very desirable improvement.

Having thus described my invention, what I claim is—

1. The combination with a brake-bar, a lever, and intermediate connections between the lever and the brake-bar, of a segmental ratchet-bar having ratchet-teeth on its upper or outer edge, a support to which one end of the ratchet-bar is pivoted, a guide on the lever constructed with an abutment or shoulder against which the lower or inner edge of the ratchet-bar bears, a ratchet-dog pivoted to the lever and constructed to engage or slide over the ratchet-teeth, and a spring connected with the dog and acting to force it in engagement with the ratchet-bar and to bind the inner or lower edge thereof against the said abutment or shoulder, substantially as described.

2. The combination with a brake-bar, a swinging lever, and connections between the lever and the brake-bar, of a segmental ratchet-bar having ratchet-teeth in its upper or outer edge, a support to which one end of the ratchet-bar is pivoted, a plate secured to one side of the lever and constructed with an abutment or shoulder against which the lower or inner edge of the ratchet-bar bears, a dog pivoted to the lever and having a beveled extremity to engage the ratchet-bar, a spring connected with the beveled extremity of the dog to force it in engagement with the teeth of the ratchet-bar and to bind the latter against said abutment or shoulder, a pivoted finger-piece, and a link connection between the finger-piece and the dog for disengaging the latter from the teeth of the ratchet-bar, substantially as described.

3. The combination with a brake-bar, a rock-shaft connected with the brake-bar, and a lever secured to the rock-shaft, of a segmental ratchet-bar having ratchet-teeth in its upper or outer edge, a support to which the lower end of the ratchet-bar is pivoted, an abutment or shoulder on the lever against which the lower or inner edge of the ratchet-bar bears, a ratchet-dog pivoted to the lever and constructed to engage the teeth of the ratchet-bar, a spring acting on the dog to force it in engagement with the teeth of the ratchet-bar and to bind the lower or inner edge of the latter against said abutment or shoulder, a hand-lever connected with the lever of the rock-shaft, a tripping wire or rod connected with the ratchet-dog, and a finger-piece mounted on the hand-lever and engaging the tripping wire or rod for disengaging the ratchet-dog from the teeth of the ratchet-bar, substantially as described.

In testimony whereof I have hereunto set my hand in presence of two subscribing witnesses.

CHAS. SAMPLE.

Witnesses:
ALBERT H. NORRIS,
F. B. KEEFER.